P. KAMINSKI.
APPARATUS FOR INDICATING AT A DISTANCE THE SPEED OF SHAFTS OR THE LIKE.
APPLICATION FILED JAN. 13, 1912.

1,166,765.

Patented Jan. 4, 1916.

Witnesses
H H Knight
Ray J. Ernst.

Inventor
Paul Kaminski
By his attorneys

UNITED STATES PATENT OFFICE.

PAUL KAMINSKI, OF SPANDAU, GERMANY, ASSIGNOR TO SIEMENS & HALSKE A. G., OF BERLIN, GERMANY, A CORPORATION OF GERMANY.

APPARATUS FOR INDICATING AT A DISTANCE THE SPEEDS OF SHAFTS OR THE LIKE.

1,166,765.   Specification of Letters Patent.   Patented Jan. 4, 1916.

Application filed January 13, 1912. Serial No. 671,103.

*To all whom it may concern:*

Be it known that I, PAUL KAMINSKI, a subject of the German Emperor, and residing at Spandau, Germany, have invented certain new and useful Improvements in Apparatus for Indicating at a Distance the Speeds of Shafts or the like, of which the following is a specification.

My invention relates to apparatus for indicating at a distance the speed of shafts or the like by means of an electric transmission plant comprising a transmitting and a receiving element, the revoluble shaft acting upon the transmitting element.

A primary object of my invention is to provide for the stated purpose transmission devices in which all the indications are brought about as far as possible during one single revolution of the transmitting and receiving element, because such devices transmit indications with the greatest possible accuracy. The transmitting element of such an arrangement may not be rigidly coupled with the revoluble shaft, but may be subjected to only a torque which corresponds to the speed of the shaft and brings about the desired indication. According to my invention this torque is exercised by means of a coupling system which is substantially based upon the principle of eddy-current brakes, in which a system of magnets and an eddy-current conductor both revoluble relatively to each other and relatively to a fixed support, act upon each other.

In the present invention a system of magnets is preferably coupled with the device whose speed is to be indicated, while a disk-like or drum-shaped eddy-current conductor is connected with the transmitting element of the electric transmission system, because the eddy-current conductor is, in general, lighter than the system of magnets, and thus frictional losses in the transmitter which impair the accuracy of the indications are kept small.

Instead of the rotating system of magnets I may employ a stationary system whose field acting on the eddy-current conductor is periodically varied by the rotation of a toothed iron body connected with the driving shaft, so that eddy-currents are generated in the conductor.

Two illustrative embodiments of my invention are represented as examples in the accompanying drawing, wherein:—

Figure 1:
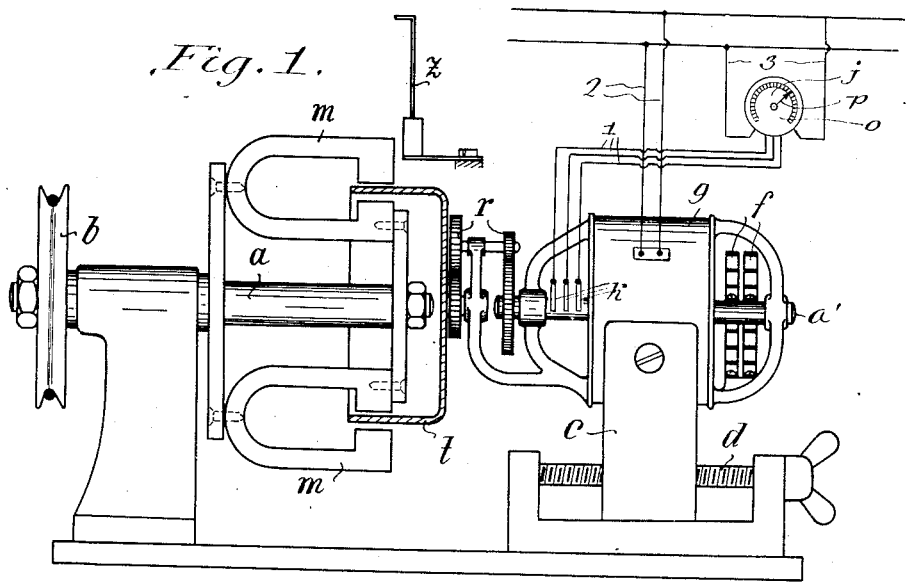
Figure 2:
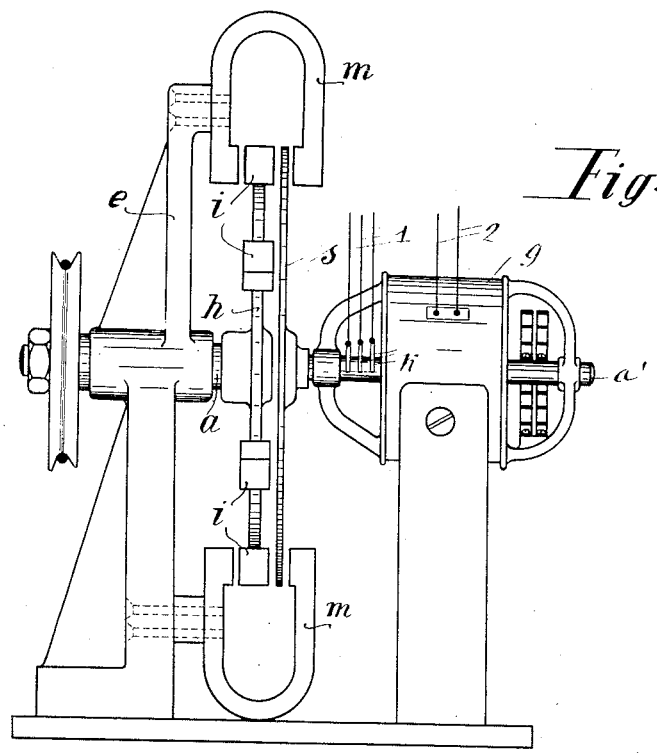

Figure 1 is a side elevation, partly in section, showing one form of my apparatus, and Fig. 2 is a side elevation showing another form.

Referring firstly to Fig. 1, a shaft *a* is rotated by the machine-shaft, whose speed is to be indicated, by means of a grooved pulley *b* or the like. Fast on the shaft *a* are several permanent magnets *m* between whose poles is revolubly arranged an electrically conducting drum *t*. This drum, or disk as shown in Fig. 2, may be directly connected with the axle *a'* of the transmitter *g* of the electric transmission system (which will be described later) but in the illustrative embodiment shown in Fig. 1, a reduction gearing *r* is interposed between the drum and the transmitter, so that one revolution of the transmitter shaft corresponds with several revolutions of drum *t*. In this manner a greater torque is obtained at the transmitter shaft than when the transmitter is directly driven, and it is possible to maintain a sufficient torque for the indicator by means of only a small eddy-current coupling.

The transmitter *g* may be of any well known type, but I prefer to use a small three phase A. C. generator *g* the armature of which is connected in opposition to the armature of the receivers of indicator *j* by line wires 1 leading from slip rings *k* on the shaft *a'* to similar rings arranged on the shaft of the receiver. The desired number of receivers is connected in parallel to the line wires 1 at any suitable distance from the transmitter. The general construction of receiver *j* is similar to that of the generator *g* so that its detail illustration and description has been omitted here. The field windings of both the transmitter *g* and the receiver *j* are connected by line wires 2 and 3 respectively to the mains 4 of an alternating current source and thus generate similar alternating current fields. The E. M. F. of the transmitter's and receiver's armature° hold each other in equilibrium so long as the armatures and the fields remain in the same relative positions to one another. If one of the armatures say that of the transmitter, is moved out of its normal resting position equalizing currents are generated in the armature circuit which tend to bring the armature of any receiver, connected to line 1 into the corresponding angular position.

The transmitter $g$ is actuated by means of the eddy current coupling. The magnets $m$ rotating about the same axis as the drum $t$ generate eddy currents in the latter which exert a pull or a drag upon said drum corresponding in its strength with the rotative speed of the magnets. Thus drum $t$ and the armature of the alternator or transmitter $g$ connected therewith tend to follow their movement. In this way the above mentioned equalizing currents are generated in the armature of the transmitter which when conducted over line wires 1 to the armature of the receiver produce a corresponding torque in the latter so that it is rotated into an angular position corresponding with that of the transmitter armature. A pointer $p$ fixed to the receiver armature is thereby rotated accordingly. The pointer $p$ sweeping over a dial $o$ thus gives the desired indication in proportion to the drag or pull exerted onto the drum $t$ by the magnets $m$. A system of springs $f$ tends to rotate the axle $a'$ of the transmitter $g$ opposite to the direction in which the magnets tend to pull it and tend to return it into zero position.

The transmitter $g$ is adjustable axially by means of an adjusting screw $d$ threaded into the support $c$. When adjusting the transmitter the eddy-current conductor mounted on the frame of the transmitter is pushed more or less between the poles of the rotating magnets $m$; the strength of the torque can thereby be exactly regulated.

In order to avoid errors in the indications and to obtain the greatest possible accuracy, it is preferable to use for the eddy-current conductor a material affected as little as possible by changes of temperature.

Fig. 1 also shows a device by means of which it is possible to check up the indications obtained through the transmitter and to permit calibration at any time. One or more resonance tongues or reeds $z$ are arranged in such manner that they are periodically struck by the rotating magnets $m$ or that they are influenced by the vibration of the entire apparatus. A tongue vibrated at the periods of its natural vibrations vibrates distinctly visibly. The tongues are tuned so that they designate by their vibration one or more predetermined speeds. The values thus obtained can consequently at any time be compared with the indications of the transmitter $g$ or of the receiver dependent thereon. In the case both do not agree regulation may be effected, for example, by the above mentioned mode of adjustment by means of the adjusting screw $d$.

In the form represented in Fig. 2 the magnets $m$ are fixed on a frame $e$. A disk $s$ constituting the eddy-current conductor is arranged between the magnets and mounted on the axle $a'$ of the transmitter $g$. A second disk $h$ fast on the axle $a$ is so arranged that iron teeth $i$, arranged radially or tangentially on its periphery, pass between the poles of the magnets when the axle $a$ rotates. The magnetic flux traversing the eddy-current conductor $s$ is varied corresponding to the velocity of the shaft $a$ and produces the eddy-currents which produce the torque. In this arrangement the rotating mass is materially less than that of the magnets shown in Fig. 1.

Of course it is assumed that the transmitter is of the same construction as that described with reference to Fig. 1, and also that the receiver which is not shown in Fig. 2 is connected to it as shown in Fig. 1.

I claim:—

1. The combination, with a speed indicating instrument, of a synchronous electric motor provided with an armature having a predetermined normal position and being free to rock to a limited extent from said normal position, a generator electrically connected with said armature to cause the same to rock, and mechanism adapted to be connected to the revoluble shaft whose speed is to be measured for actuating the rotor of the generator by variations in speed of said shaft.

2. The combination, with an indicating instrument, a synchronous electric motor for actuating the same, and an electric generator for supplying currents to said motor, of a revoluble disk connected to the armature of said generator, a magnet disposed adjacent to said disk and movable for the purpose of exposing said disk to a rotating magnetic field in order to turn said disk, a spring for retracting said disk, and rotating connections adapted to connect said magnet and the shaft the speed of which is to be indicated.

3. The combination, with a speed indicating instrument, of a synchronous electric motor connected with said instrument for actuating the same, an electric generator for supplying current to said motor, gearing including a magnetic coupling for causing changes in speed of the shaft whose speed is to be measured to shift the position of the rotor of said generator, and means independent of the rotation of said shaft for supplying alternating currents of constant frequency to the fields of said generator and said motor.

4. The combination with a speed indicating instrument, of an electric motor connected with said instrument for actuating the same, an alternating current generator synchronously connected to said motor, and magnetic means independent of the generator and controllable by changes in speed of the revoluble shaft whose speed is to be measured for shifting the rotor of said generator into different positions.

5. In apparatus for indicating at a distance the speed of revolving parts of machines the combination with a shaft adapted to be connected to said parts, and an electric transmitter, comprising an A. C. generator, of an electric indicating device having its armature connected in opposition to the armature of the generator, both adapted to move in similar alternating current fields, and an eddy-current coupling adapted to connect the generator with said shaft.

6. In apparatus for indicating at a distance, the speed of revolving parts of machines, the combination with a shaft adapted to be connected to said parts, and an electric transmitter having a shaft, of an eddy-current coupling for connecting said transmitter shaft with said first named shaft and an electric indicating device operated by the transmitter.

7. In apparatus for indicating at a distance the speed of revolving parts of machines, the combination with a shaft adapted to be connected to said parts, and an electric transmitter having an oscillatory armature, of an electric indicating device electrically connected with said transmitter and actuated in accordance with the angular movement of said armature and an eddy-current coupling adapted to connect the oscillatory armature with said shaft.

8. The combination with a speed indicating instrument, a synchronous electric motor for actuating said instrument, and an electric generator for supplying current to said motor, of mechanism including a magnet adapted to be driven by the revoluble shaft whose speed is to be measured, and a rotatable disk connected to the generator armature, supported in the rotating field of said magnet and controlled by the changing speed of said shaft for shifting the armature of said generator into different positions, and means for supplying alternating currents of constant frequency to the fields of said generator and said motor.

In testimony whereof, I have signed this specification in the presence of two witnesses.

PAUL KAMINSKI.

Witnesses:
   HENRY HASPER,
   WOLDEMAR HAUPT.